United States Patent Office 3,647,592
Patented Mar. 7, 1972

3,647,592
POLYESTER BONDING PROCESS
Paul T. Woodberry, Reading, Mass., assignor to P. R.
Mallory & Co. Inc., Indianapolis, Ind.
No Drawing. Filed July 24, 1968, Ser. No. 747,069
Int. Cl. B32b *17/02, 17/04*
U.S. Cl. 156—285                                10 Claims

ABSTRACT OF THE DISCLOSURE

A process for forming a bond between polyester and a substrate by heating the polyester in a vacuum and thereafter bonding the polyester to the substrate by the application of temperature and pressure and/or electric potential thereto. The substrate may be an electrical conductor or semiconductor such as a metal sheet or foil, or it may be an inorganic electric insulator such as a glass.

---

The present invention relates to a process for bonding polyester to a substrate and, more particularly, a polyester film to a metallic substrate.

In general, there are a number of various and diverse methods for forming a bond between a plastic and other materials, such as metals or glasses. However, each plastic appears to have its limitations or problems with respect to each bonding method. Polyester, for example, can be advantageously bonded to a substrate material by a method employing heat and pressure, such as in dielectric sealing for films. Additionally, a method employing an elevated temperature and an electrostatic field through the materials can be utilized; however, the peel strength, as will be more fully discussed hereinafter, measured in pounds per inch width, is reported to be less than about 1 pound per inch width.

As can be appreciated from the foregoing, a method for bonding a polyester to a substrate which minimizes or obviates many of the limitations of the prior art as well as resulting in bonds which exhibit improved peel strengths would represent an advancement in this art.

In general, the process of the present invention is directed to achieving an improved bond between a polyester and a substrate by heating the polyester in a vacuum and thereafter bonding the pre-heat treated polyester to the sbstrate, all of which will be more fully discussed hereinafter. The process results in a strong bond being formed between the polyester and the substrate. For example, the strength of the bond, as evidenced by its peel strength, is usually greater than about 1 pound per inch width and a bond in excess of 3 or 4 pounds per inch width can in some cases be achieved. This, of course, represents an improvement in bond strength over prior art methods, as previously discussed.

Since the process is not completely understood, the following theoretical explanation of the process is presented with the intention that it is in no way a limitation of the process of the present invention. It appears, however, that the vacuum heat treatment of the polyester below its softening point accomplishes the removal of volatiles and modification of the polyester to a more thermally stable condition resulting in the polyester and substrate forming a strong bond. Moreover, this process does not appear to affect, at least to any appreciable degree, the appearance and/or other advantageous physical properties normally associated with a polyester. The formation of the strong bond being formed between the polyester and substrate after the polyester has been vacuum heat treated in a simple and straightforward manner is, in any event, believed to be truly surprising and totally unexpected.

The polyesters useful in the present invention are those which can be generally classified as an esterification reaction product between one or more polyhydric alcohols with one or more polybasic acids such as $\alpha,\beta$-unsaturated polycarboxylic acids and/or saturated polycarboxylic acids and include cross-linked polyesters which are obtained using a cross-linking component containing an unsaturated group such as an ethylenic group, $>C=C<$, or vinyl group, $CH_2=C<$. Cross-linking components include styrene, the nuclear or side chained substituted styrenes such as 3,4-dichlorostyrene, $\alpha$-chlorostyrene, $\alpha$-methylstyrene; other vinyl-substituted hydrocarbons such as $\alpha$ or $\beta$ vinylnaphthalene or 4-vinyl biphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketone; the alkenes such as isobutylene and 2-pentene; the olefinic ethers such as vinyl methyl ether and vinyl isobutyl ether; and the like.

Preferred polyesters are the phthalates and terephthalates and particularly preferred is polyethylene terephthalate. In addition, preferred polyesters are also those which are films and particularly films ranging in thickness of from about 0.25 mil to about 14 mil and, more particularly, from about 0.50 mil to 4.0 mils.

Substrate materials which can be used in accordance with the process of the present invention include inorganic insulating materials such as the glasses including pyrex glass and soft glass, quartz, ceramics such as porcelain, and electrical conductors or semiconductor metals, including the valve metals, or metal alloys. Metals which can be employed include copper, nickel, aluminum, molybdenum, platinum, beryllium, palladium, silicon, iron and alloys of the same as well as other alloys, such as Kovar (an alloy of cobalt, nickel manganese and iron) and Permalloy (an alloy of nickel and iron). The substrate can be of a single homogeneous layer of a material, or can be a composite, such as a laminate of various materials. The compositing of the laminated substrate can, in some instances, be carried out simultaneously with the process of the present invention, for example, if the laminated composite substrate comprises at least one layer of a polyester contacting or alternating between several substrate layers.

Preferred substrate materials which can be used in accordance with the process of the present invention include metallic foils, and particularly aluminum and copper foil, ranging in thickness of from about 0.25 mil to 500 mils and, more particularly, from about 1 mil to about 100 mils.

The step of heating the polyester in a vacuum is, in general, carried out at a temperature below the softening point of the polyester. This temperature, of course, will vary depending upon, inter alia, degree of vacuum used, specific material used and the like. Preferably, the temperature ranges from about 10° C. to about 100° C. below the softening point of the polyester and particularly preferred is a temperature from about 20° C. to about 50° C. below the softening point. For example, temperatures which can be used for a polyethylene terephthalate film having a softening point of about 290° C. range from about 190° C. to about 280° C. Extreme vacuum conditions, such as those below about $10^{-5}$ mm. Hg, during the heating are not required and the degree of vacuum necessary will vary depending upon, inter alia, the temperature and specific material used. Generally speaking, vacuums of less than about 100 mm. Hg are usually suitable and preferably below about 1.0 mm. Hg. A definite time period for the vacuum heat treating does not appear to be required since some advantages can be obtained by carrying out this step for only a period of a few hours and, of course, there does not appear a maximum limit although such is governed by the usual commercial and economic considerations. It is preferred, however, that the time period range from about 2 hours to about 36 hours and particularly preferred from about 5 hours to about 18 hours.

The bonding of the pre-treated polyester to the substrate can be carried out in many and various ways which include the application of heat and pressure and/or electrostatic potential as discussed more fully hereinafter or other conventional methods such as dielectric heat sealing. In general, the various factors, such as temperature and pressure and/or electrostatic potential, time and the like are all interrelated considerably. The bonding temperatures are below the softening point of the polyester and are usually within the temperature ranges previously noted in the pre-heat treatment of the polyester. Suitable pressures for bonding can also vary and there does not appear to be a maximum pressure limit except those pressures which under other process conditions will cause the materials to extrude. Preferably, however, pressures are in excess of about 2.0 p.s.i. and range from about 5 p.s.i. to about 5,000 p.s.i.

As previously mentioned, an electrical potential can also be used in the bonding process. The strength and method of application of the electrostatic field established by the potential will vary with the shape, size and composition of the polyester and of the substrate; polarity of the field appears to be immaterial. Again, as a practical matter, the field will normally be applied by connecting a source of electric potential to a pair of electrodes stationed at opposite surfaces of the desired composite or laminate. Therefore, although the field must be present through the polyester, it may also be present through the substrate material, if the substrate also has dielectric characteristics. Any external layer of the composite which is an electrical conductor may, of course, itself serve as an electrode. The bonding is a function of the applied electrostatic potential and the temperature and the values will vary dependent upon the particular film composition. The applied potential is a function of, inter alia, the thickness of the polyester and is usually less for thin films than for thick films and, in any event, should not exceed the breakdown potential of the polyester material. In the case of polyester films generally available the voltage will be in the range of about 100 to 3000 volts. A specific example is described hereinafter wherein the applied potential is in the range of 1,000 volts. Typical field strengths generally range between 10 and $50 \times 10^6$ volts per meter. Upper limits of field intensity are set by the dielectric strength of the particular materials used.

If direct current is employed the polarity of the applied potential is generally not material, and experience indicates that the bond formed by the present process can be effected with the substrate adjacent an electrode of either polarity. It is believed that the bond can be in part a mechanical bond formed by filling in and wetting of the substrate surface irregularities by the polyester material. It also seems that electrical heating of the composite by the applied voltage is of small effect, generally amounting to less than 120 milliwatts per square centimeter of the laminate. Furthermore, the gross mechanical pressure exerted directly between the electrodes by the presence of the field is relatively small. The field does, however, apparently provide an electrostatic attraction directly between adjacent surfaces of the polyester and the substrate. It is believed that the electrostatic field may also effect a decrease in the surface tension of the polyester material at elevated temperatures and thereby promote wetting of the substrate surfaces, particularly at the sites of minute surface asperities. The presence of an electrostatic field has been found to promote wetting of a substrate by a polyester at temperatures appreciably lower than is the case when heat alone is used. The establishment of a bonded composite at these lower temperatures avoids the marked dimensional changes that can occur when polyesters are subjected to high temperatures during a bonding process.

Any conventional bonding apparatus useful in bonding a plastic to a substrate by heat and pressure and/or electric potential can be utilized in carrying out the process of the present invention and such include heated platens between which the materials to be bonded are placed and then pressure such as hydraulic pressure is applied to the platens or heated rollers between which the materials to be bonded are passed with the rollers adjusted to exert the necessary pressure, if used, on the materials. In instances where an electric potential is used, the platens and/or rollers can be made, if desired, of suitable electrode materials.

Peel strength, as used herein, refers to the pounds per inch width of a 180° peel on specimens approximately 3 inches long and ¼ inch wide as determined using an Instron tensile machine following the guide lines of Federal Test Method Standard No. 175 (Method 1041.1) or a beam balance device whose results have been found to correlate remarkably well with the Instron tensile machine.

The following examples are presented to illustrate the invention.

EXAMPLE 1

A terephthalate polyester film having a thickness of about 1 mil is heated under vacuum for about 16 hours at about 236° C. and about 72 hours at about 259° C. The film is then placed between two pieces of aluminum foil each having a thickness of about 2 mils in order to provide an aluminum-polyester-aluminum laminate. The laminate is placed between two platens under pressure of about 1,000 p.s.i.g. and heated at about 270° C. for about 2 minutes.

The peel strength of a ¼ inch wide strip of the laminate averages about 4 pounds per inch width and the bond appears to be uniform over all of the strip.

EXAMPLE 2

A terephthalate polyester film having a thickness of about 1 mil is heated under vacuum for about 16 hours at about 236° C. The film is then placed between two pieces of aluminum foil each having a thickness of about 2 mils in order to provide an aluminum-polyester-aluminum laminate. The laminate is placed between two platens under pressure of about 50 p.s.i.g., heated at about 257° C. while a direct current potential of about 1,000 volts is applied across the laminate, with the top aluminum foil positive, for about 2 minutes.

The peel strength of ¼ inch wide strips of the laminate averages about 3.6 pounds per inch width and the bond appears to be fairly uniform over all of the strip.

In addition, it should be noted that similar or comparable results are also obtained under substantially the same process conditions as described hereinbefore when using other substrate materials, such as, glass, quartz, porcelain, copper, nickel, and silicon.

I claim:
1. A method for bonding a polyester film to a substrate comprising:
   heating said polyester film at a temperature of from about 10° C. to about 100° C. below its softening point in a vacuum of less than about 100 mm. Hg,
   placing said polyester film in surface contact with a substrate selected from the group consisting of glass, quartz, porcelain and metals, and
   applying a pressure of in excess of about 2.0 p.s.i. on said polyester film and said substrate while said polyester film is heated below its softening point for a time sufficient to effect a bond therebetween.
2. In a method according to claim 1, wherein an electric potential of from about 100 to 3,000 volts is applied across said polyester film and said substrate.

3. In a method according to claim 1, wherein said polyester film has a thickness from about 0.05 mil to about 4.0 mils.

4. In a method according to claim 3, wherein said substrate is a metallic foil.

5. In a method according to claim 4, wherein said polyester is polyethylene terephthalate.

6. In a method according to claim 2, wherein said polyester film has a thickness from about 0.50 mil to about 4.0 mils.

7. In a method according to claim 6, wherein said substrate is a metallic foil.

8. In a method according to claim 7, wherein said polyester is polyethylene terephthalate.

9. In a method according to claim 8, wherein said metallic foil is aluminum foil.

10. In a method according to claim 8, wherein said metallic foil is a copper foil.

References Cited

UNITED STATES PATENTS

| | | | |
|---|---|---|---|
| 3,442,868 | 5/1969 | Kazno Ogata et al. | 260—75 M |
| 3,439,020 | 4/1969 | Kitabataka | 260—75 M |
| 3,438,942 | 4/1969 | Scheller | 260—75 M |
| 3,318,758 | 5/1967 | Tell | 156—272 X |
| 3,287,197 | 11/1966 | Errede | 156—272 |
| 3,282,722 | 11/1966 | Hailstone | 156—272 X |
| 3,192,092 | 6/1965 | Schonhorn | 156—332 X |
| 3,185,668 | 5/1965 | Meyer | 260—75 M |
| 2,952,578 | 9/1960 | Carlson | 156—275 X |
| 2,642,370 | 6/1953 | Parsons et al. | 156—320 |

CARL D. QUARFORTH, Primary Examiner

G. G. SOLYST, Assistant Examiner

U.S. Cl. X.R.

156—272, 275, 309, 322